J. F. BROWN.
ATTACHMENT FOR SCRAPERS.
APPLICATION FILED FEB. 23, 1915.

1,155,039.                                      Patented Sept. 28, 1915.

Witnesses
Fenton S. Belt
J. W. Sherwood

Inventor
James F. Brown
By Franklin H. Hough
Attorney

UNITED STATES PATENT OFFICE.

JAMES F. BROWN, OF BOKHOMA, OKLAHOMA.

ATTACHMENT FOR SCRAPERS.

1,155,039.      Specification of Letters Patent.      Patented Sept. 28, 1915.

Application filed February 23, 1915. Serial No. 9,992.

*To all whom it may concern:*

Be it known that I, JAMES F. BROWN, a citizen of the United States, residing at Bokhoma, in the county of McCurtain and State of Oklahoma, have invented certain new and useful Improvements in Attachments for Scrapers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments to cotton scrapers, the object in view being to produce a means whereby the scrapers may be held at different distances apart to regulate the distance intermediate the same and the stems of the plants upon either side of which the scrapers are drawn.

More specifically, the invention consists in the provision of clamping means secured to the handles or beam of the scraper which are adapted to hold the standards of the scraper, horizontally disposed, adjustable bars being provided, the ends of which have cross-pieces which abut against each other, thus limiting the movements of the scrapers toward each other.

The invention consists of various details of construction, combinations and arrangements of parts which will be hereinafter fully described, shown in the accompanying drawings and then specifically defined in the appended claims.

Figure 1:
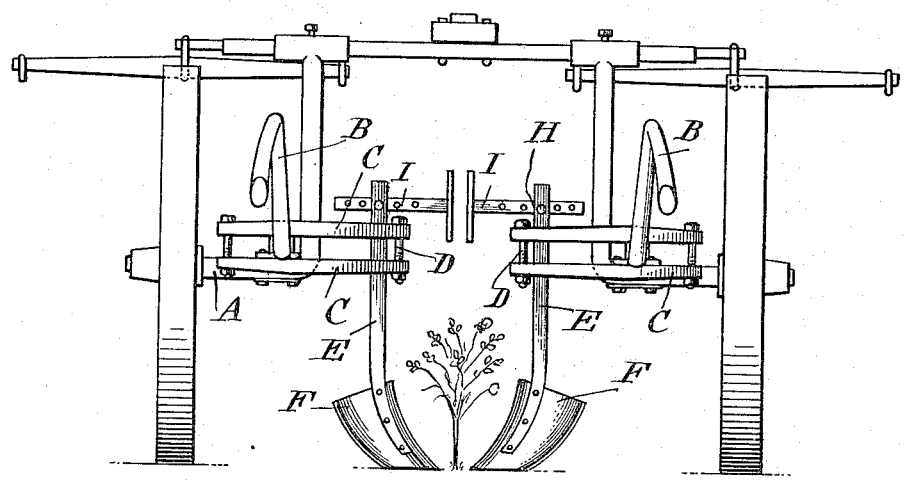
Figure 2:
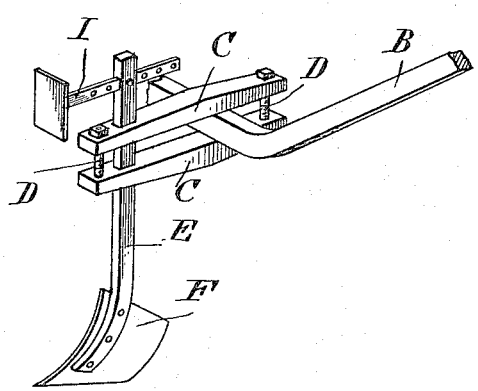

I illustrate my invention in the accompanying drawings, in which:

Figure 1 is a rear elevation, and Fig. 2 is an enlarged detail perspective view.

Reference now being had to the details of the drawings by letter, A designates the frame of a cotton scraper having handles B and clamping members C held by bolts D upon the handles and which clamping members carry the standards E having scrapers F secured thereto. Each of said standards is apertured for the reception of a bolt H, and I designate perforated bars horizontally disposed and held in different adjusted positions by means of the bolts H which pass through registering apertures therein. Each bar has a plate fastened at its inner end adapted to abut against each other to limit the movement of the scrapers toward each other.

By the provision of an attachment embodying the features of my invention, it will be noted that a simple and efficient means is afforded whereby the distance at which the scrapers are held may be regulated, thus limiting their movement toward each other, thereby causing the scrapers to cut the weeds and soil at varying distances from the row of plants.

What I claim to be new is:—

An attachment for scrapers comprising, in combination with a frame having a drop axle handle upon the frame, parallel clamping members engaging said handles upon either side, screws adapting the members to be held at different angles to the axle, said members having registering apertures therein, an apertured scraper standard mounted in said registering apertures, a perforated bar mounted in the aperture of the standard, a pin carried by the latter and designed to hold the bar in different positions, and a plate at the inner end of the bar.

In testimony whereof I hereunto affix my signature in presence of two witnesses.

JAMES F. BROWN.

Witnesses:
THOS. DOLLASHIVE,
H. M. SCHOSEFIELD.